United States Patent Office 3,535,279
Patented Oct. 20, 1970

3,535,279
PREPARATION OF POLYMERS OF THE POLYARYLIDENE TYPE (I)
Johny Camille Hermans, Leuven, and Georges Joseph Smets, Heverlee, Belgium, assignors to Gevaert-Agfa N.V., Mortsel, Belgium, a Belgian company
No Drawing. Filed Apr. 20, 1967, Ser. No. 632,188
Claims priority, application Great Britain, May 12, 1966, 21,201/66
Int. Cl. C08g 33/00
U.S. Cl. 260—47
5 Claims

ABSTRACT OF THE DISCLOSURE

Homopolyarylidenes and copolyarylidenes are formed by means of the decomposition of a tosylhydrazone of an aromatic or heterocyclic aldehyde or a mixture of such tosylhydrazones as follows:

(I) Refluxing and agitating at least one tosylhydrazone starting material dissolved in a two phase liquid heterogeneous mixture, one phase being a solvent for the polymer to be formed and the other phase being a solvent or mixture of solvents for the tosylhydrazone starting material which is immiscible with the first phase, (II) Making the medium strongly alkaline by the addition of an alkali hydroxide whereby the reaction medium becomes vividly colored, (III) Continuing the refluxing and agitation until the reaction medium is completely decolorized, and (IV) Precipitating in a non-solvent the homopolyarylident or copolyarylidene formed. These polyarylidenes are soluble in a wide variety of organic solvents and have film-forming and coating properties.

---

The present invention relates to a process for the preparation of polymers of the polyarylidene type i.e. polymers consisting of a polymethylene chain, each carbon atom of which is substituted by an aromatic group or a heterocyclic group having an aromatic character.

It is known to prepare polybenzylidene by the decomposition under anhydrous conditions at −80° C. of phenyldiazomethane in toluene catalysed by boron trifluoride-diethylether.

It has now been found that polymers and copolymers of the polyarylidene type can be prepared by an alkaline thermal decomposition in heterogeneous medium of tosylhydrazones of aromatic or heterocyclic aldehydes.

According to the invention a process is provided for the preparation of polymers of the polyarylidene type, as hereinbefore defined, which process comprises:

refluxing while strongly stirring at least one tosylhydrazone of an aromatic or heterocyclic aldehyde dissolved in a heterogeneous mixture consisting of (A) a liquid containing a solvent for the polymer to be formed and (B) a liquid immiscible with the first one, which is preferably a solvent or a mixture of solvents for the tosylhydrazone of the aromatic or heterocyclic aldehydes used, making strongly alkaline the reaction medium by the addition of an alkali hydroxide whereby the reaction medium becomes vividly coloured, continuing refluxing while stirring until complete discolouration of the reaction medium, and precipitating in a non-solvent the polymer of the polyarylidene type formed.

It was surprising to find that polymers could be formed in a heterogeneous alkaline medium. Indeed, it was known that by the thermal decomposition in protic solvents such as ethylene glycol of benzaltosylhydrazone in the presence of an excess of sodiummethylate as base only benzyl glycol ether and benzyl tolyl sulfone were obtained as reaction products.

By the thermal decomposition in an aprotic reaction medium, on the contrary, with an excess of sodium methylate, benzazine and stilbene were obtained as reaction products; with less than an equivalent amount of base, however, benzaldehyde - N - benzyl-tosylhydrazone and occasionally sulfone were mainly obtained.

The heterogeneous reaction medium of the invention comprises as a first element a solvent for the polymers of the polyarylidene type to be formed, occasionally mixed with an alcohol. Among these solvents may be mentioned: benzene, toluene, chloroform, carbon tetrachloride, cyclohexanone, dioxane, and pyridine and examples of suitable alcohols are methanol, isopropyl alcohol, t-butyl alcohol, etc. The second element constituting the heterogeneous reaction mixture is a liquid, in which the tosyl hydrazone used preferably dissolves but which is immiscible with the solvents mentioned above for the polymers to be formed. Examples of this group of solvents are: diethyl ether, acetone, petroleum naphtha, ethylene glycol, methanol and dimethyl formamide. The choice of the solvents to be used from the two mentioned series of solvents is limited in every case separately, by the requirement that a heterogeneous reaction medium must be obtained i.e. that the two solvents should be immiscible. Very good results are obtained with a heterogeneous mixture of benzene and ethylene glycol; best results, however, are attained with a mixture of benzene, water and methanol, in which mixture the benzene constitutes about 50% of the total amount and methanol about 10%.

Examples of tosyl hydrazones of aromatic aldehydes which can be used for the polymerisation reaction are: tosylhydrazones of benzaldehyde, p-bromobenzaldehyde, o-, m- and p-methoxybenzaldehyde, α- and β-naphthaldehyde and 9-anthraldehyde. Tosylhydrazones of heterocyclic aldehydes such as pyridinealdehydes can be used too.

The polymerisation reaction according to the present invention proceeds as follows. The tosylhydrazone of the aromatic or heterocyclic aldehyde is for instance added to a heterogeneous mixture of water, methanol and benzene whereupon the temperature of the reaction medium is raised, while strongly stirring, to the reflux temperature. Once this temperature is reached the reaction medium is made strongly alkaline (pH 13–14) e.g. by the addition of the appropriate amount of sodium hydroxide. The reaction mixture is now vividly coloured by the formation of substituted diazomethanes. While continuing strongly stirring and keeping the reaction medium at the reflux temperature the substituted diazomethane decomposes whereby the colour disappears gradually. After complete discolouration, the benzene layer formed, in which the polyarylidene has dissolved, is separated and the polyarylidene is precipitated in methanol.

The addition of alkali hydroxide promotes the decomposition of the tosylhydrazone of the aromatic or heterocyclic aldehyde. The thermal decomposition is also catalysed by other basic compounds such as sodium methylate and sodium glycolate.

It is not only possible to prepare according to the process of the invention, homopolymers of the polyarylidene type but also copolymers by the addition to the heterogeneous reaction medium of two or more tosyl hydrazones such as benzaltosylhydrazone and p-bromobenzal-tosylhydrazone.

The thermoplastic polymers obtained are transparent and have film-forming properties. They can also be used as protective coatings on all kinds of supports.

According to the process of the invention polyarylidenes are produced having recurring units corresponding to the following formula:

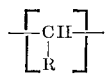

wherein R represents a phenyl or heterocyclic radical either substituted or not, or a polynuclear aromatic or heterocyclic radical, either substituted or not.

It is also possible to prepare according to the present invention copolyarylidenes having recurring units corresponding to the following formulae:

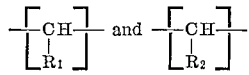

wherein each of $R_1$ and $R_2$ represents different phenyl or heterocyclic radicals, either substituted or not, or polynuclear aromatic or heterocyclic radicals, either substituted or not.

Homopolymers and copolymers composed of recurring units of the above general formulae, except for the homopolymers wherein R represents solely an unsubstituted phenyl radical, are new per se.

The following examples illustrate the present invention.

EXAMPLE 1

In a 500 ccs. three-necked flask fitted with a reflux condenser 10 millimols of benzaltosylhydrazone, dissolved in a mixture of 50 ccs. of benzene, 10 ccs. of methanol, and 40 ccs. of water are placed. While strongly stirring with a magnetic agitator the temperature of the reaction mixture is raised to the reflux temperature (67–69° C.). After having refluxed for about 5 minutes 25 millimols of sodium hydroxide are added. The tosylhydrazone decomposes and phenyldiazomethane is formed whereby the reaction medium becomes red-coloured. Refluxing is continued on an oil bath (100–110° C.) while keeping on strongly stirring. The phenyldiazomethane decomposes gradually which is visible from the gradual disappearance of the red colour. After complete discolouration the reaction medium is allowed to come to rest and the benzene layer is separated. The benzene layer is poured into an excess of methanol whereby the polymer dissolved precipitates. The polybenzylidene formed is composed of recurring units of the general formula:

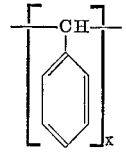

and has a molecular weight of about 5900, which points to an average polymerisation degree of 65 ($=x$). About 85% of the benzaltosylhydrazone used has been converted.

The polybenzylidene formed is soluble in benzene, toluene, chloroform, carbon tetrachloride, cyclohexanone, dioxane and pyridine whereas it is insoluble in dimethyl ether, acetone, petroleum naphtha, methanol and dimethyl formamide. Melting point: ±280° C.

EXAMPLES 2–6

In the process of Example 1 the benzaltosylhydrazone is replaced by different substituted benzaltosylhydrazones. The results of the different polymerisation reactions are given in the table below.

| Example | Tosylhydrazone | Recurring units of polymer obtained | Mol. weight | Polymerisation degree | Melting point | Yield, percent |
|---|---|---|---|---|---|---|
| 2 | p-Bromobenzaltosylhydrazone | —[CH(C₆H₄Br)]ₓ— | 5,900 | 35 | >260 | 72 |
| 3 | p-Chlorobenzaltosylhydrazone | —[CH(C₆H₄Cl)]ₓ— | ---- | ---- | >260 | 70 |
| 4 | o-Methoxybenzaltosylhydrazone | —[CH(C₆H₄OCH₃)]ₓ— | 1,200 | 10 | ---- | 92 |
| 5 | m-Methoxybenzaltosylhydrazone | —[CH(C₆H₄OCH₃)]ₓ— | 5,900 | 50 | >260 | 70 |
| 6 | p-Methoxybenzaltosylhydrazone | —[CH(C₆H₄OCH₃)]ₓ— | 720 | 6 | ≈185 | 71 |

The poly-p-bromobenzylidene of Example 2 is soluble in benzene, toluene, chloroform, dioxane, cyclohexanone and pyridine but is insoluble in dimethyl ether, petroleum naphtha, methanol and dimethylformamide.

The poly-p-chlorobenzylidene of Example 3 is soluble in benzene and does not dissolve in methanol.

The poly-o-methoxybenzylidene of Example 4 dissolves in benzene and toluene but is insoluble in methanol and petroleum naphtha.

The poly-m-methoxybenzylidene of Example 5 is soluble in benzene, toluene, chloroform, carbon tetrachloride and cyclohexanone but is insoluble in dimethyl ether, acetone, petroleum naphtha, methanol and dimethylformamide.

The poly-p-methoxybenzylidene of Example 6 is soluble in benzene and toluene but does not dissolve in methanol and petroleum naphtha.

EXAMPLES 7–9

In the process of Example 1 the benzaltosylhydrazone is replaced by different homologues of benzaltosylhydrazone. The results of the polymerisation reactions are given in the following table.

and substituted benzaltosylhydrazones. After the chemical decomposition copolymers are obtained. The results of the polymerisation reactions are given in the following table.

| Example | Substituted benzaltosylhydrazone | Mol. weight of the copolymer | Melting point | Yield, percent |
|---|---|---|---|---|
| 11 | p-Bromobenzaltosylhydrazone | 6,000 | 220° | 80 |
| 12 | m-Methoxybenzaltosylhydrazone | 5,500 | >260° | 70 |
| 13 | p-Chlorobenzaltosylhydrazone | -------- | >260° | 80 |

The copoly(benzylidene/p-bromobenzylidene) of Example 11 is soluble in benzene, toluene, dioxane, and chloroform. It is insoluble in methanol, dimethyl ether, petroleum naphtha and dimethylformamide.

The copoly(benzylidene/m-methoxybenzylidene) obtained according to Example 12 is soluble in benzene, toluene, chloroform and carbon tetrachloride whereas it is insoluble in methanol, dimethyl ether, petroleum naphtha, acetone and dimethylformamide.

| Example | Tosylhydrazone | Recurring units of the polymer obtained | Mol. weight | Polymerisation degree | Melting point | Yield, percent |
|---|---|---|---|---|---|---|
| 7 | α-Naphthaltosylhydrazone | [—CH— naphthyl—]x | 1,500 | 10 | ≈220 | 22 |
| 8 | β-naphthaltosylhydrazone | [—CH— naphthyl—]x | 10,000 | 71 | >260 | 72 |
| 9 | 9-anthraltosylhydrazone | [—CH— anthryl—]x | 800 | 4 | ≈170 | 89 |

The poly-α-naphthylidene of Example 7 and the poly-β-naphthylidene of Example 8 are soluble in benzene and insoluble in methanol and petroleum naphtha. The poly-9-anthranylidene of Example 9 is soluble in benzene and insoluble in methanol.

EXAMPLE 10

When in the reaction of Example 1 benzaltosylhydrazone is replaced by the tosylhydrazone of m-pyridinealdehyde, poly-m-pyridylidene having recurring units of the following formula:

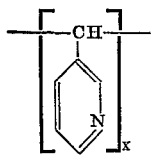

and having a melting point at about 260 C. is obtained. The poly-m-pyridylidene is soluble in benzene, toluene, water, dioxane and chloroform but is little soluble in methanol.

EXAMPLES 11–13

In the process of Example 1 benzaltosylhydrazone is replaced by equimolar amounts of benzaltosylhydrazone The copoly(benzylidene/p-chlorobenzylidene) obtained in Example 13 dissolves in benzene but does not dissolve in methanol.

What we claim is:

1. A process for the preparation of polymers of the polyarylidene type, which comprises:
   refluxing while strongly stirring at least one tosylhydrazone of an aromatic aldehyde dissolved in a two-phase, liquid heterogeneous mixture consisting essentially of (1) a liquid containing a solvent for the polymer to be formed, and (2) a second liquid immiscible with the solvent contained in the first liquid,
   making the medium strongly alkaline by the addition of an alkali hydroxide whereby the reaction medium becomes vividly colored,
   continuing refluxing while stirring until complete discoloration of the reaction medium, and
   precipitating in a non-solvent the polymer of the polyarylidene type formed.

2. A process according to claim 1, wherein the tosylhydrazone used is taken from the group consisting of benzaltosylhydrazone, p-bromo-benzaltosylhydrazone, p-chloro-benzaltosylhydrazone, o-, m- and p-methoxybenzaltosylhydrazone, α- and β-naphthaltosylhydrazone, and 9-anthraltosylhydrazone.

3. A process according to claim 1, wherein the heterogeneous mixture is composed of a mixture of benzene and ethylene glycol.

4. A process according to claim 1, wherein the heterogeneous mixture is composed of a mixture of benzene, water and methanol containing 50% by volume of benzene and 10% by volume of methanol relative to the total amount of the mixture.

5. The process according to claim 1 wherein the said second liquid comprises at least one solvent for the said aromatic-aldehyde tosylhydrazone starting material.

References Cited

D'Alelio, Fundamental Principles of Polymerization, N.Y. Wiley, 1952 (pp. 18–19 relied on).

Bawn et al.; J. Polymer Sci., 33, 21–26 (1958).

WILLIAM H. SHORT, Primary Examiner

M. GOLDSTEIN, Assistant Examiner

U.S. Cl. X.R.

260—2, 32.6, 32.8, 33.2, 33.4, 33.6